United States Patent [19]

Hoo

[11] 4,212,283
[45] Jul. 15, 1980

[54] ROTARY ENGINE

[76] Inventor: Ong S. Hoo, 3-17-21, Koishikawa Bunkyo-ku, Tokyo, Japan

[21] Appl. No.: 792,551

[22] Filed: May 2, 1977

Related U.S. Application Data

[63] Continuation-in-part of Ser. No. 542,681, Jan. 20, 1975, abandoned.

[30] Foreign Application Priority Data

Jan. 25, 1974 [JP] Japan .................................. 49-11271

[51] Int. Cl.² ............................................. F02B 53/12
[52] U.S. Cl. .................................... 123/210; 123/211
[58] Field of Search ....................... 123/8.09, 210, 211

[56] References Cited

FOREIGN PATENT DOCUMENTS 2344690  3/1974  Fed. Rep. of Germany ............ 123/210
1191814  5/1970  United Kingdom ...................... 123/211

*Primary Examiner*—Michael Koczo
*Attorney, Agent, or Firm*—Robert E. Burns; Emmanuel J. Lobato; Bruce L. Adams

[57] ABSTRACT

An ignition plug is housed in a plug channel the cross-section of which reduces towards the end of the channel remote from the plug, and which terminates in an opening which is narrower in the direction of engine rotation. Burning efficiency is thereby enhanced, with effective constraint of harmful exhaust gas production.

3 Claims, 7 Drawing Figures

ROTARY ENGINE

CROSS-REFERENCE TO RELATED APPLICATION

This is a continuation-in-part of the earlier application, Ser. No. 542,681, filed on Jan. 20, 1975, by the present applicant, and now abandoned.

BACKGROUND OF THE INVENTION

The present invention relates to a rotary engine having an eccentrically rotatable rotor of a substantially triangular cross sectional profile encased within a trochoidal type housing.

Earlier rotary engines were on the one hand accompanied by such advantages as having smooth rotation, high output power and low production of NOx which is harmful to human beings, but were on the other hand accompanied by such disadvantages as having low economical merit for the users of the rotary car engines.

The invention relates to a rotary engine having a narrow plug channel connecting the plug and chamber.

The invention relates in particular to such an engine having an ignition system comprising a pair of plug channels each comprising a single ignition plug.

Rotary internal combustion engines, particularly of the trochoidal type, have been provided with a casing having a pair of ignition plugs disposed in the peripheral wall thereof. A first plug is positioned adjacent a second plug along a line parallel to the direction of rotation of the engine rotor. Such two plug ignition systems are employed to obtain a high fuel burning efficiency.

To avoid contact with the apex seal of the rotor during operation, the plugs are set in channels in the peripheral casing. Between the electrode of each ignition plug and the internal face of the casing a connecting passage or plug channel extends. The transverse cross-sectional profile of one of the plug channels reduces towards the end of the channel remote from the electrode, to prevent interference with the ignition spark, (which is otherwise caused by the presence of incompletely burnt gas deposits on the electrode, as particles of the air/fuel mixture are urged towards the electrode due to the inertia imparted to the mixture by the rotor and as the rotor apex tends to collect unburned fuel particles from the internal peripheral wall of the casing, some of which particles are forced up the plug channel by the gas flow generated as the apex of the rotor crosses the opening to the first plug channel in the peripheral wall of the casing).

SUMMARY OF THE INVENTION

The principal object of the present invention is to provide a rotary engine of a type able to assure a high economy in its fuel consumption.

Another object of the present invention is to provide a rotary engine with better combustion of its fuel mixture, resulting in less polluted gases harmful to human beings.

A further object of the present invention is to enhance the ignitability of the fuel in a rotary engine.

A further object of the present invention is to provide a rotary engine with desirable flow and dispersion of burning gas in the combustion chamber.

A further object of the present invention is to provide a rotary engine in which the ignition plug electrodes are always kept clean.

A further object of the present invention is to provide a rotary engine in which lubrication can be very effectively carried out with minimized oil consumption.

In accordance with these objects, there is provided according to the present invention a rotary piston internal combustion engine comprising a peripheral wall having a trochoidal inner surface, a rotor eccentrically mounted on a rotatable shaft to perform a planetary motion within the chamber defined by the inner surface of the peripheral wall, the rotor being substantially triangular in cross-section and having its apex edges in sliding contact with the inner trochoidal surfaces of the peripheral wall. According to the invention, the engine has an ignition system comprising a first plug channel terminating in an opening in the trochoidal inner surface and accommodating an electrode of an ignition plug, the opening of this first plug channel having a cross-sectional configuration which is narrower in the direction of rotation of the rotor than in the direction of the axis of rotation of said rotor.

BRIEF DESCRIPTION OF THE DRAWINGS

Further features of the present invention will be clear from the ensuing description with reference to the accompanying drawings which are included by way of illustration only. In the Drawings.

DESCRIPTION OF THE PREFERRED EMBODIMENT AND OF PREFERRED DETAILS

Figure 1:
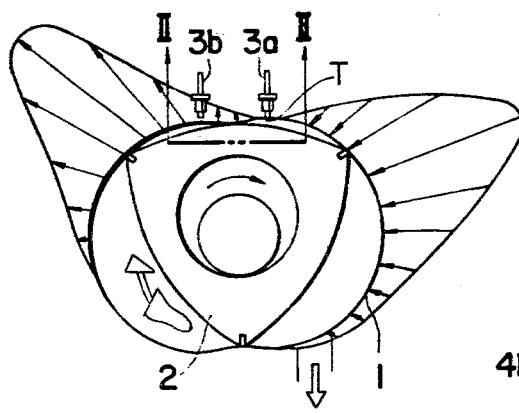
FIG. 1 is a vertical sectional diagram showing a pressure differential distribution in a rotary internal combustion engine according to the invention.
Figure 2:
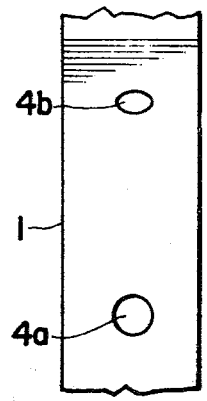
FIG. 2 is a partial vertical sectional view of the rotary engine shown in FIG. 1.

Referring to FIGS. 1 and 2: the rotary engine has a peripheral wall 1 whose inner surface defines a two-lobed epitrochoid, and a rotor 2 of substantially triangular transverse cross-section which is rotatably mounted on an eccentric shaft so as to perform a planetary motion within the chamber defined by the peripheral wall 1. Two ignition plugs 3a and 3b are disposed in the peripheral wall 1 of the engine casing. As shown in greater detail in FIG. 2, the electrodes of the ignition plugs 3a and 3b communicate with the chamber through respective ignition plug channels 4a and 4b which terminate in an opening in the peripheral wall 1 on its inner surface. Conventionally, the circular opening of 4b is smaller in shape than the opening of 4a.

As is clearly seen from the drawings, the rotor 2 is slidingly in contact with the inner surface of the peripheral wall 1 by its three apex seals 6, which divide the chamber into three working spaces. In operation, a pressure difference exists between the respective pressures in the working spaces 7a and 7b, which are separated by an apex seal 6 of the rotor 2, when that apex seal is at a position other than the pressure turning point T shown in FIG. 1.

Owing to the pressure difference between the two working spaces 7a and 7b, gas flows from the space 7a into the space 7b at the moment when the apex seal 6 of the rotor 2 passes across the opening of the plug passage 4b. This gas flow, of a relatively dense air/fuel mixture together with fuel adhering to the apex seal 6, is directed towards the electrode of the ignition plug 3b as shown by the arrow in FIG. 2, thereby hindering smooth sparking of the ignition plug 3b. In order to prevent any malfunction in the ignition it is conventional to minimize the area of the opening of the plug passage 4b to a relatively small circular aperture, thereby reducing the amount of gas which can flow toward the electrode. However, this minimization in the opening of the plug passage 4b induces an undesirable lowering in the ignition power of the plug 3b, especially when the rotary engine is operating at low rotational speeds. In other words, the lowering in the ignition power counteracts the advantage brought about by reducing the size of the opening of the plug passage 4b.

Figure 3:
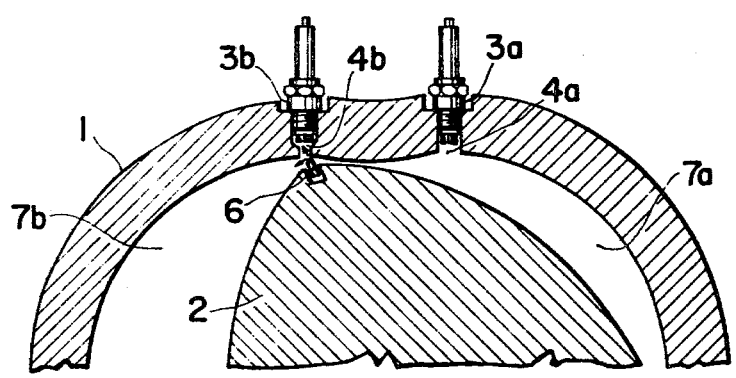
FIG. 3 is a view seen along the line II—II in FIG. 1 of one embodiment of a detail.

One embodiment of the plug passage according to the present invention is shown in FIG. 3. In this embodiment the plug passage 4b has an elliptical cross-section whose major axis is substantially parallel to the axis of rotation of the rotor 2.

Figure 4:
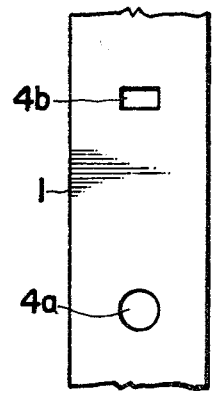
FIG. 4 is a view along line II—II in FIG. 1 of still another embodiment of the detail.

The opening of the plug passage 4b may, however, have any shape which is longer in its direction parallel to the axis of rotation of the rotor than in the direction of rotation. For example, the opening of the plug channel 4b may be rectangular in shape, in which case the longer sides are substantially parallel to the axis of rotation of the rotor as shown in FIG. 4.

In all of the above-identified embodiments of the invention, the second plug passage 4a has a plain, circular cross-section since its location is at the pressure turning point T. At that position, there is little gas flow generated when the apex seal 6 of the rotor 2 passes across it.

In the partial view of FIG. 2, several elements of the complete engine are omitted, for the sake of simplicity. They will be understood from FIG. 1, which shows the basic engine completely.

As already noted above, special improvement is applied to the structure of the ignition plug channel in order to assure an effective ignition.

Conventionally, a rotary engine has three combustion chambers separated from each other by the apex seals of the rotor. One resulting pressure difference between the combustion chambers on both sides of the apex, i.e. the front and rear sides, of an apex seal, is shown in FIG. 1.

As seen in this figure, when the rotor apex is at the rear side of the pressure turning point J, whereat the pressure difference is zero, the pressure of the front chamber is higher than that of the rear chamber and when the rotor apex is at the front side of the pressure turning point J, the pressure of the rear chamber becomes higher than that of the front chamber.

Figure 5:
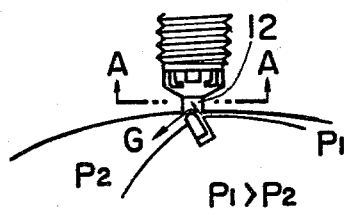
FIG. 5 is a schematic side view of a detail.

Therefore, when the ignition plug 3b is located at the rear side of the pressure turning point J, the ignition plug channel 12 should be so-shaped as to converge forwardly, as shown in FIG. 5. This is because, when the ignition plug channel opens in the housing inner wall at the rear side of the pressure turning point J, the gas flows as shown in the direction of an arrow G in FIG. 5, while the apex seal passes through the opening; that is, the gas leaks from the front chamber towards the rear chamber. A part of the gas so leaking is blown towards the ignition plug electrodes as shown by a small upward arrow in the drawing, and this causes oil mixture to be stuck on the plug electrodes. This is caused by the fact that relatively dense fuel tends to concentrate at the rear part of the combustion chamber due to the inertia of the air-fuel mixture and the moving apex seals so functionate as to scrape the oil and fuel sticking on the housing inner wall. The gas blown to the plug electrodes consequently contains an appreciable amount of lubricating oil and fuel. Due to this oil fuel sticking, the ignition plug electrodes is considerably soiled and its ignitability is seriously lowered. In order to effectively prevent such an undesirable oil fuel contamination of the ignition plug electrodes, it is necessary to minimize the gas leaking time. This is achieved as the ignition plug channel is constructed in a forwardly converging form (FIG. 5).

This converging channel structure, which thus effectively prevents undesirable oil contamination of the plug electrodes, may on the other hand cause another problem in the engine operation. That is, when the channel converges forwardly, smooth flow of the gas into the combustion chamber through the plug channel tends to be barred by this convergent structure of the plug channel and therefore ignition of the air-fuel mixture caused by the plug electrodes sparking may not be effectively propagated into the entire combustion chamber, resulting in a low combustion efficiency of the engine; in addition, the burnt gas may stagnate in the ignition plug chamber, and tend to form a bar to the subsequent ignition in the chamber.

Figure 6:
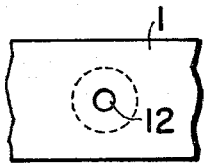
FIG. 6 and FIG. 7 are views generally similar to FIGS. 3 and 4, showing other modified details.
Figure 7:
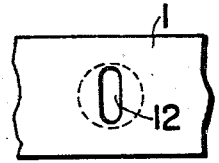

An embodiment of the present invention proposing a solution to such a problem is shown in FIG. 7, in which the opening part of the ignition plug channel 12 is given in a rather flat oval cross sectional profile. With this improved channel opening structure, the length of time needed for the passage of the apex seal over the plug channel can be kept as short as that in the embodiment shown in FIG. 6, resulting in minimizing gas leakage and, further, as the cross sectional area of the channel is kept larger even on the opening terminal side, a very smooth communication between the channel interior and the combustion chamber is assured resulting in excellent ignitability of the engine. The cross-sectional profile of the major part of the channel is still kept substantially circular even then the channel opening is deformed as flat.

The present invention may be applied to rotary internal combustion engines having only one plug, particularly when the location of the plug channel is at a point other than the pressure turning point T.

What I claim is:

1. A rotary internal combustion engine, comprising:
   a wall structure defining a combustion chamber, having means for supplying an air-fuel mixture to the chamber and for withdrawing products of combustion from the chamber, the chamber having a trochoidal inner surface;
   a substantially triangular rotor having a power output shaft eccentrically secured thereto, the shaft being mounted centrally in and extending from the chamber, the rotor having three apex edges in contact with said inner surface so that on combustion of the air-fuel mixture in the chamber, the rotor performs a planetary motion in a direction along said inner surface, with the apex edges sliding along the surface; and
   an ignition system, comprising, a plug channel extending through the wall, located at a position before a pressure turning point having a restricted opening in the trochoidal inner surface, and an ignition spark plug structure having a spark-producing electrode disposed in said channel and spaced from said inner surface, said opening being narrower in said direction than in a direction parallel to the shaft, whereby combustion of the air-fuel mixture in the chamber is facilitated.

2. A rotary internal combustion engine according to claim 1 wherein the opening of the plug channel is shaped as an ellipse having its major axis substantially parallel to the shaft.

3. A rotary internal combustion engine according to claim 1 wherein the ignition system also includes a second plug channel having an opening adjacent the first-mentioned plug channel and spaced therefrom so that the apex edges pass it after passing the opening of the first-mentioned plug channel.

* * * * *